(12) United States Patent
Hwang

(10) Patent No.: US 6,243,461 B1
(45) Date of Patent: Jun. 5, 2001

(54) CALLER-IDENTIFICATION RECEIVING APPARATUS

(75) Inventor: Bar-Chung Hwang, Taoyuan (TW)

(73) Assignee: Winbond Electronics Corp., Hsin-Chu (TW)

( * ) Notice: Subject to any disclaimer, the term of this patent is extended or adjusted under 35 U.S.C. 154(b) by 0 days.

(21) Appl. No.: 09/089,331

(22) Filed: Jun. 2, 1998

(30) Foreign Application Priority Data

Apr. 21, 1998 (TW) .................................................. 87206061

(51) Int. Cl.[7] .............................. H04M 1/00; H04M 1/56
(52) U.S. Cl. ........................ 379/372; 379/88.21; 379/142
(58) Field of Search .............................. 379/88.19, 88.21, 379/93.17, 93.23, 127, 142, 179, 258, 372–373, 376, 382, 386, 354; 455/13.4, 38.3, 342, 522, 574

(56) References Cited

U.S. PATENT DOCUMENTS

| | | | |
|---|---|---|---|
| 4,731,814 | * 3/1988 | Becker et al. | 455/574 |
| 5,825,852 | * 10/1998 | Depond et al. | 379/376 |
| 5,907,605 | * 5/1999 | Ramirez et al. | 379/142 |
| 5,974,552 | * 10/1999 | Lim et al. | 379/142 |

* cited by examiner

Primary Examiner—Huyen Le
Assistant Examiner—George Eng
(74) Attorney, Agent, or Firm—Thomas, Kayden, Horstemeyer & Risley

(57) ABSTRACT

A caller-identification receiving apparatus can process the data message of a caller-identification without a microcontroller by utilizing a ring signal to activate circuits in a sleeping state while the telephone is on-hook. Moreover, the device has a timer to automatically activate the circuits in the sleeping state to detect the signal of a channel seizure and process the message-waiting.

9 Claims, 3 Drawing Sheets

CALLER-IDENTIFICATION RECEIVING APPARATUS

CROSS-REFERENCE TO RELATED APPLICATION

This application claims the priority benefit of Taiwan application Ser. No. 87206061, filed Apr. 21, 1998, the full disclosure of which is incorporated herein by reference.

BACKGROUND OF THE INVENTION

1. Field of the Invention

This invention relates to a receiving apparatus preferably used in telephone with functions to process a caller-identification, and more particularly to a function, which is able to process the caller-identification and automatically detect signal of channel seizure and then process the message-waiting.

2. Description of Related Art

The emergence of the telephone has allowed two far apart places to be brought seemingly close together. Nowadays, due to the highly developed technology of telecommunication, functions of the telephone have been significantly promoted either, for example, functions of a fixed forward, a call waiting, a caller-identification, and a voice mail box. The function of a caller-identification apparatus is such that when a call rings, the receiver is able to obtain the telephone number and other related information through the caller-identification to decide whether to receive the call or not and thus prevent receiving unnecessary calls. The function of a voice mailbox is to provide a service for leaving messages when the receiving party can't receive the call at the time it was placed.

The protocol of sending a caller-identification (caller-ID) was developed by Bell Communications Research (Bellcore). When a call is dialed, the data message of the caller-ID is sent from the switchboard to the destination every two seconds. Referring to FIG. 1, the protocol for sending a caller-ID is arranged in a time sequence, in which a ring 10 is sent first. About 0.5 seconds later a signal of a channel seizure 11 is sent and then, a mark 12 with 150 ms duration is sent. Finally the data message 13 including the data message of the caller-ID is sent. The next ring 14 is sent a few seconds later for the next cycle. The caller-ID is sent by utilizing a modularizing method of frequency shift keying (FSK) in which, for example, a frequency of 1200 Hz represents the logic state "1" and a frequency of 2200 Hz represents the logic state "0" and the sending rate is 1200 bits per second (bps). The signal of the channel seizure 11 is formed in a series of logic data mixed with a number of "0" and "1". Following that, a signal of mark 12 is in a form of continuous logic state "1". The first logic state "0" after the mark is interpreted as an end of the mark. Then the date, time and telephone number grouped as the information of the data message 13 are sent immediately after the mark 12.

If the caller ID user also has voice mail and a call is received while in an on-hook state, the switchboard will send a message-waiting. The protocol for sending a message-waiting is arranged in a time sequence as illustrated in FIG. 2. Referring to FIG. 2, the protocol starts with a channel seizure 21 having a duration of 250 ms, then a mark 22 and the data message 23 including the information of the message-waiting follows the channel seizure 21 sequentially.

In general, for a telephone having ability to process the caller-ID in an on-hook state, to save the power consumption, only the necessary parts of circuits are kept in a working mode such as the ring and the detecting circuits. Other parts of circuits are kept in a sleeping state. When the detecting circuits detect a ring, the circuits should activate all other related parts to process the caller-ID.

In the case that the user has applied the service of the voice mail box, since the message-waiting has no ring acting as the leading signal, the related parts to process the message-waiting need to be activated periodically to detect whether the signal of a channel seizure appears or not. If the signal of a channel seizure has been detected the circuit is kept in the working mode to process the incoming information.

The conventional method to process the caller-ID and the message-waiting utilizes a micro-controller to control the whole system, in which the micro-controller is always kept in working mode so that the micro-controller can sense the arrival of a ring and activate the related parts to process the caller-ID.

For the case to process the message-waiting, because there is no ring as the leading signal, the micro-controller has to activate the related parts for processing the message-waiting periodically to see if there is a signal of a channel seizure existing or not to decide if the related actions should be activated or not. This procedure can save the power consumption.

However the conventional receiving apparatus to process the caller-ID as described above has some problems as follows:

1. The micro-controller has to be always kept in the working mode to activate the related parts of circuits to detect a signal of a channel seizure. This causes the consumption of power and therefore causes the duration of use of the telephone to be reduced if the telephone is powered by battery.
2. Some specially designed software is needed to accommodate the micro-controller for being able to detect the ring and the channel seizure. This increases the complexity.

SUMMARY OF THE INVENTION

It is therefore an objective of the present invention to provide a caller-ID receiving apparatus preferably used in a telephone that can automatically detect the signal of a channel seizure and process a message-waiting.

It is another objective of the present invention to provide a caller-ID receiving apparatus not needing the micro-controller, in which the receiving apparatus can be made completely in a hardware circuit without the need of the software to fulfill the functions of detecting the signal of the channel seizure and processing the message-waiting. This gives the advantages that the complexity can be reduced and the fabricating cost can be brought down.

In accordance with the foregoing and other objectives of the present invention, a caller-ID receiving apparatus having the functions of being able to automatically detect the signal of the channel seizure and process the message-waiting includes: a timer, a wake-up circuit, an FSK detector & demodulator, and a data-recovery.

In the foregoing, the caller-ID receiving apparatus according to this present invention can further include a ring detector, which is coupled to the telephone wire. After a ring has been detected, the detecting circuit then sends a control signal to activate the wake-up circuit. Then the wake-up circuit activates the FSK detector & demodulator and other related parts to process the caller-ID, which has followed the ring.

Moreover, the wake-up circuit has another method for waking up. The method is to use a timer to generate a control signal to the wake-up circuit to activate all related parts and to detect if there is the signal of the channel seizure or not. If the channel seizure appears then the related parts continue the actions otherwise they return back to the sleeping state.

The FSK detector & demodulator, which is to detect an FSK signal coming through the telephone wire and decode the signal into a typical digitized signal, can be controlled by the wake-up circuit to decide whether to take action or not.

The data-recovery can receive the signal, which has been decoded by the FSK detector & demodulator, and detect the message-waiting, the mark and the caller-ID. When the return circuit is staying in the detecting the message-waiting state, if there is no signal of channel seizure detected in a certain limited time, the return circuit returns a signal to the wake-up circuit to set all related parts in a sleeping state to save the consumption of power.

In accordance with the forgoing objects, this invention of the receiving apparatus further comprises a lower-frequency clock and a frequency multiplier. The lower-frequency clock can provide the clock for the timer. Moreover, the lower-frequency clock can be transformed into a higher-frequency clock through the frequency multiplier to provide the clock for the FSK detector & demodulator.

In conclusion, compared with the conventional apparatus, the caller-ID receiving apparatus in the invention has at least advantages as follows:

1. Without the need of an additional micro-controller as used in the conventional apparatus for detecting the ring and periodically waking up the related parts, most of parts of the caller-ID receiving apparatus in the invention can stay in the sleeping state when there is no signal in order to save the consumption of power. Therefore the available duration time of a telephone powered by battery is prolonged.

2. All the control parts can be fabricated together in one single hardware circuit. Therefore without the need of a separate micro-controller and the software to support the micro-controller for detecting the ring and the signal of the channel seizure, the receiving apparatus in the invention can automatically detect the signal of channel seizure and process the data message of the message-waiting and the complexity can be reduced.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

Figure 3:
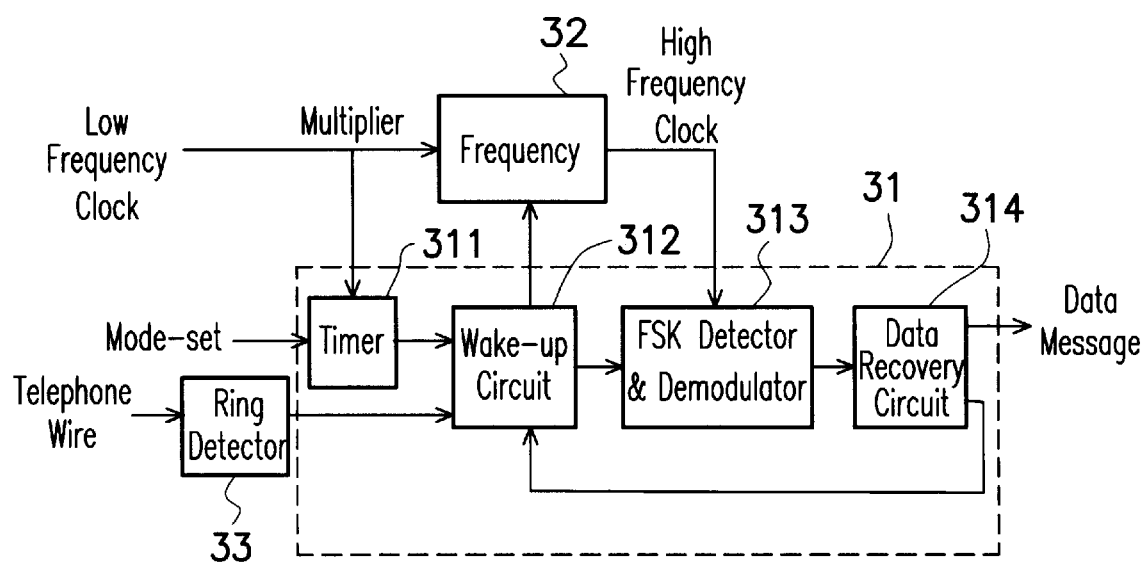
FIG. 3 illustrates the diagram of a caller-ID receiving apparatus according to the preferred embodiment of the invention.

FIG. 3 illustrates the diagrams of a caller-ID receiving apparatus according to the preferred embodiment of the invention, preferably comprising: an acceptor of caller-ID 31, a frequency multiplier 32 and a ring detector 33. The acceptor of caller-ID 31 includes: a timer 311, a wake-up circuit 312, an FSK detector & demodulator 313, and a data-recovery 314.

Usually, while the telephone is in the on-hook state, the FSK detector & demodulator 313, the data-recovery 314 and the frequency multiplier 32 stay in power-down mode so that they need to be activated in order to process the caller-ID when there is a ring, or need to be activated periodically to detect if there is a message-waiting or not.

The ring detector 33 being coupled to the telephone wire can detect a ring. If the ring appears then the ring detector 33 can send a signal to activate the wake-up circuit 312, the frequency multiplier 32 and the FSK detector & demodulator 313 to process incoming messages. Because the wake-up circuit 312 and the ring detector 33 are static circuits, there are no processes of power-down and power up, that is, waking up.

Figure 2:
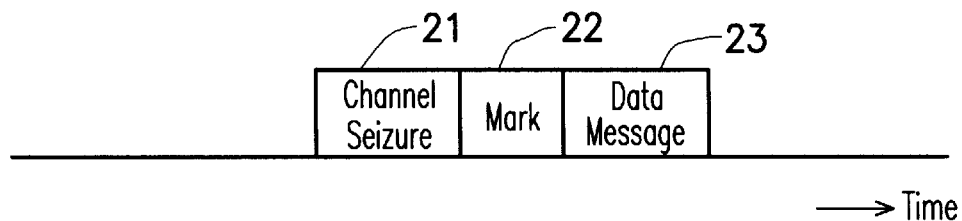
FIG. 2 illustrates the protocol of sending a message-waiting.

The acceptor of caller-ID 31 is preferably using a lower-frequency clock and a higher-frequency clock, in which the lower-frequency clock, such as 32 kHz, provides the clock for the timer 311 and the higher-frequency clock, such as 3.579 MHz, provides the clock for the FSK detector & demodulator 313. Since a metal-oxide-semiconductor circuit usually consumes the power only when its state is changed, the lower-frequency clock, such as 32 kHz, should save the consumption of power. Moreover, since the duration of the channel seizure 21 in the protocol for sending a message-waiting as shown in FIG. 2 is 250 ms, the acceptor of caller-ID 31 should be activated within 250 ms to ensure that the channel seizure 21 is not missed. In addition, because the clocks of 32 kHz have been widely used in electronic watches, the clocks are readily available. The lower-frequency clock can be transformed into a higher-frequency clock through the frequency multiplier 32 to reach the frequency of 3.579 MHz in order to provide the needed clock for the FSK detector & demodulator 313. Since the higher-frequency clock consumes more power the FSK detector & demodulator 313 stays in the power-down mode most the time until it is activated by the wake-up circuit 312.

The wake-up circuit 312, which can be controlled by the timer 311, the ring detector 33, and the data-recovery 314, controls the frequency multiplier 32 and the FSK detector & demodulator 313 to let them stay in the power-down mode or in the working mode for processing the messages.

The timer based on the lower-frequency clock is controlled by an input from a mode-set to choose the right mode for the clock, and periodically sends a control signal to the wake-up circuit 312. Then the wake-up circuit 312 activates the frequency multiplier 32 and the FSK detector & demodulator 313 to detect if there is a message-waiting.

The FSK detector & demodulator 313 not only can detect an FSK signal originating from the telephone wire but also can demodulate the FSK signal into a typical digitized signal. The FSK detector & demodulator 313 can be controlled by the wake-up circuit 312 to stay in the sleeping mode until the wake-up control signal is received.

The data-recovery 314 can receive the digitized signal output from the FSK detector & demodulator 313 in order to process and determine the signal as the channel seizure, the mark or the data message of the caller-ID and then, can export the processed data message. In the case that the timer 311 activates the wake-up circuit 312 at a fixed certain time, the wake-up circuit 312 activates the other related parts subsequently for processing the data message. The data-recovery 314 returns a control signal to the wake-up circuit 312 to put the related parts in the sleeping state to save the consumption of power if it hasn't received the signal of channel seizure within a limited time.

In accordance with the preferred embodiment of the invention, the receiving apparatus of a caller-ID has two categories of objectives, one is the procedures about receiving and processing the caller-ID and the other one is the procedures about automatically detecting the signal of the channel seizure and processing the message-waiting.

Figure 1:
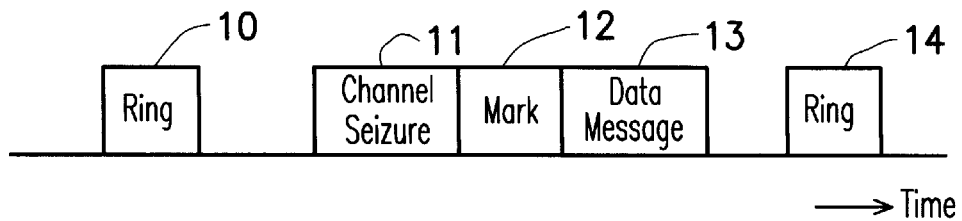
FIG. 1 illustrates the protocol of sending a caller-identification.
Figure 4:
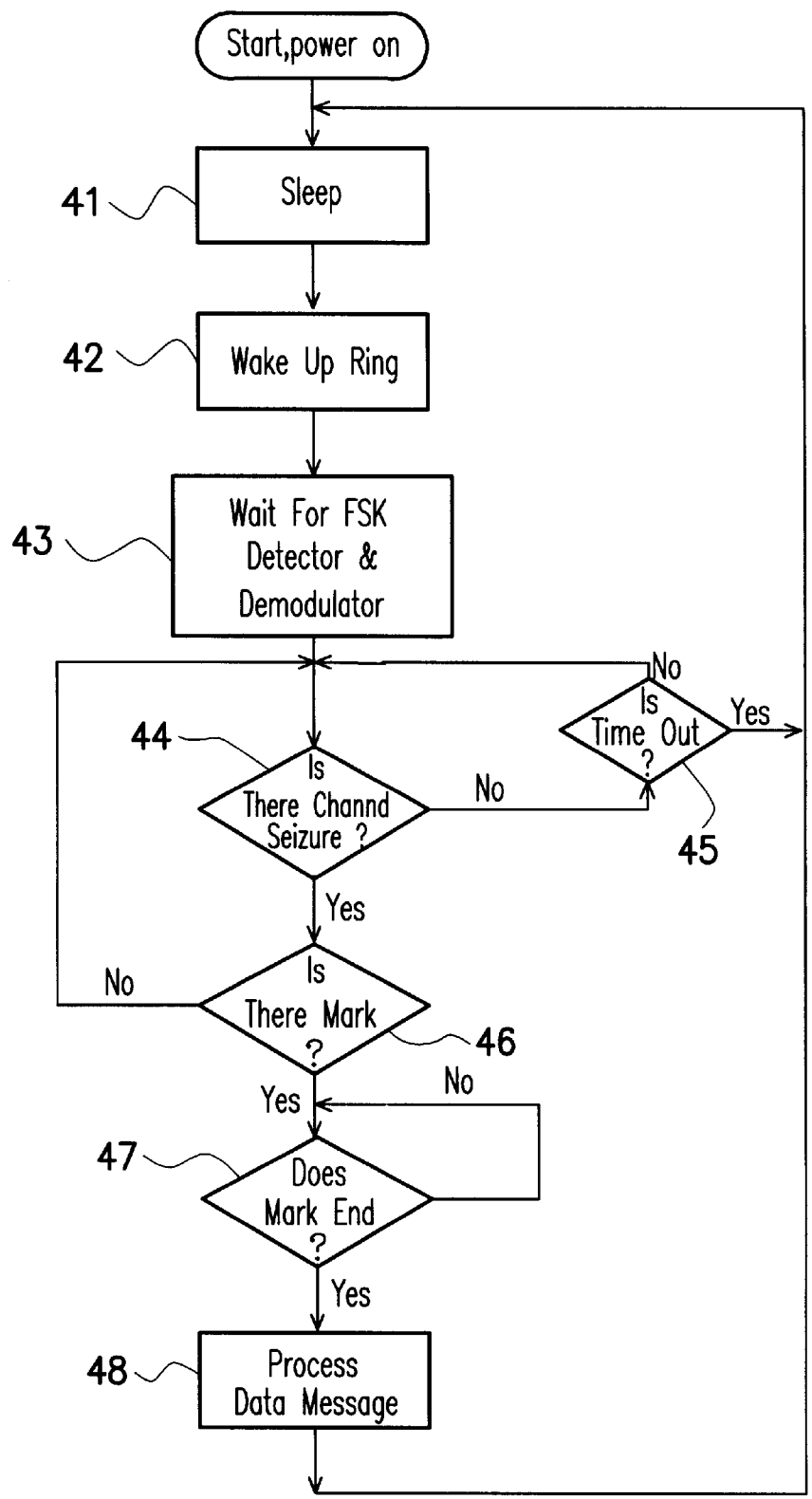
FIG. 4 illustrates the flowchart of the receiving and processing of the caller-identification.

The procedures about receiving and processing the caller-ID, as illustrated in FIG. 4, are first described in the following: referring to FIGS. 1, 3 and 4, the receiving apparatus of the caller-ID, which has a number of steps of operation, starts with being powered on by either battery or electrical source and then stays at step 41, which is the sleeping state. Subsequently, step 42 is that the receiving apparatus of the caller-ID is activated by a ring. The ring has been detected by a ring detector 33, which should send a control signal to the wake-up circuit 312 to generate control signals to the FSK detector & demodulator 313 and the frequency multiplier 32 to be ready for receiving and processing the subsequent caller-ID. Then the procedure waits at step 43 for the output of the FSK detector & demodulator 313. Step 44 is to determine whether the output from the FSK detector & demodulator 313 has the channel seizure 11 or not. If it is "Yes", then the case goes to step 46. If it is "No", then the case goes to step 45. Step 45 is to determine whether the period of waiting time for the signal of the channel seizure is over the limit or not. If it is "Yes", then the case returns to step 41 staying in the sleeping state. If it is "No", then the case returns to step 44 to continue detecting the signal of the channel seizure 11. If the logic output of the step 44 is "Yes", the case goes to step 46, which is to detect whether there is mark 12 or not. If the logic output of step 46 is "No", the case returns back to step 44 again. If it is "Yes" then the case goes to step 47 to see if the mark 12 has ended. If the logic output of step 47 is "No", then the loop continues on checking until the output turns to "Yes". If it is "Yes" then the case goes to step 48 for processing the data message of the caller-ID. After the processing has finished, the case returns back to the origin at step of 41.

Figure 5:
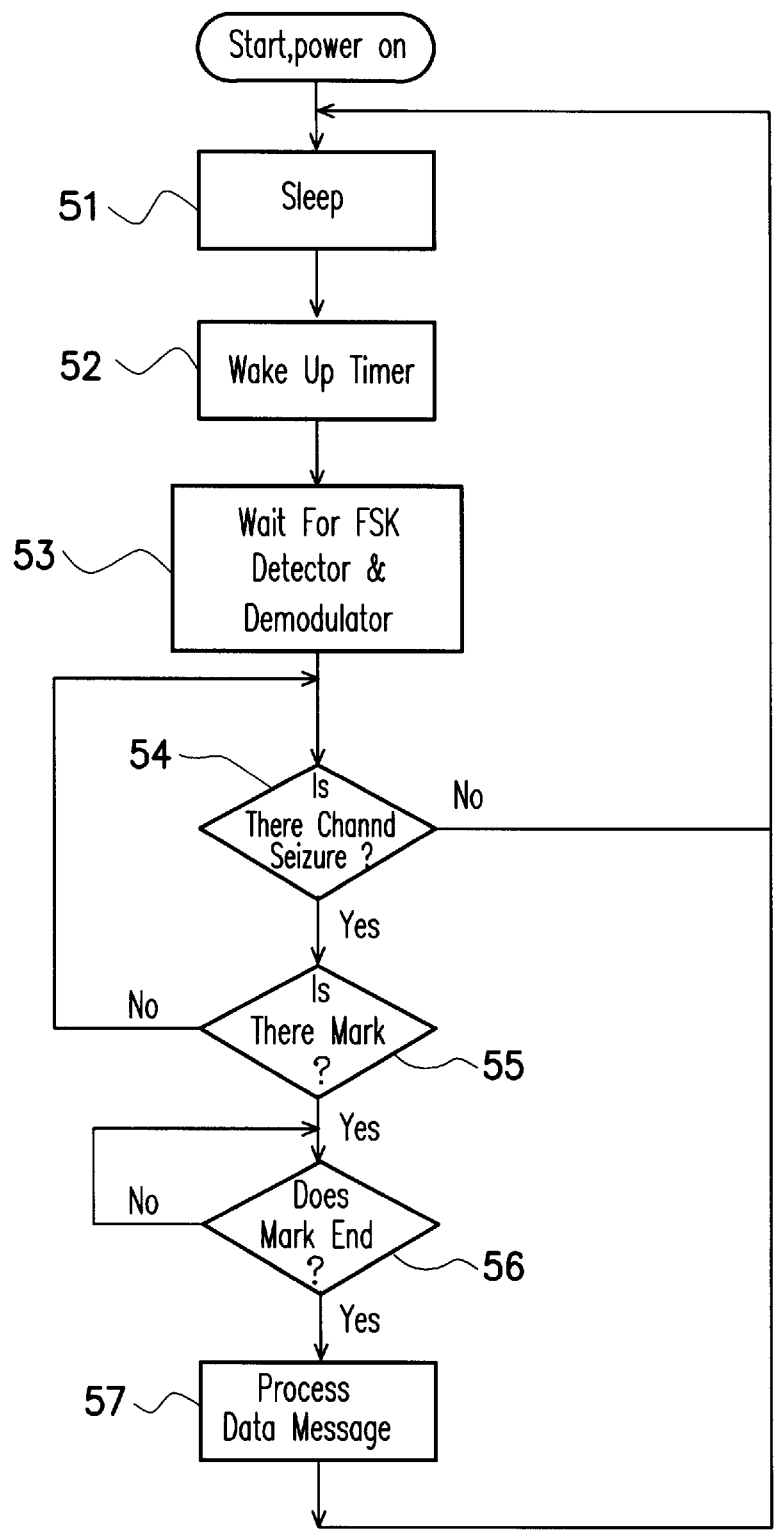
FIG. 5 illustrates the flowchart of the receiving and processing of the message-waiting.

Next, the other procedures about automatically detecting the signal of the channel seizure and processing the message-waiting, as illustrated in FIG. 5, are described in the following: referring to FIGS. 2, 3 and 5, the receiving apparatus of the caller-ID, which has a number of steps of operation, starts with being powered on by either battery or electrical source and then stays in step 51 at the sleeping state. Then, subsequently, step 52 is that the receiving apparatus of the caller-ID is activated by the timer 311, which is to generate a control signal to activate the wake-up circuit 312. The wake-up circuit 312 then generates control signals to the FSK detector & demodulator 313 and the frequency multiplier 32 to make them ready for detecting the signal of the channel seizure 21. The following step 53 is to wait for the output of the FSK detector & demodulator 313. Step 54 is to determine whether the signal of the channel seizure 21 has been detected or not. If it is "No", then the case returns back to step 51. If it is "Yes", then the case goes to step 55, which is to determine whether there is the mark 22 or not. If it is "No" then the case returns back to the step 54. Otherwise the case goes to step 56 for determining whether the mark reaches the end. Then subsequently, step 57 is to process the data message of the message-waiting. After the processing has finished, the case returns back to step 51 in the sleeping state.

In conclusion, compared with the conventional apparatus the receiving apparatus of a caller-ID in the invention has at least the following advantages:

1. Without the need of an additional micro-controller used in the conventional apparatus for detecting the ring and periodically waking up the related parts, most of parts of the caller-ID receiving apparatus in the invention can stay in the sleeping state when there is no signal in order to save the consumption of power. Therefore the available duration time of a telephone powered by battery is prolonged.

2. All the control parts are able to be fabricated together in one single hardware circuit. Therefore without the need of a separate micro-controller and the software to support the micro-controller for detecting the ring and the signal of the channel seizure, the receiving apparatus in the invention can automatically detect the signal of channel seizure and process the data message of the message-waiting and the complexity can be reduced.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A caller-identification (caller-ID) receiving apparatus used in a telephone, coupled to a telephone wire to automatically detect a signal of a channel seizure and process a message-waiting, comprising:

a wake-up circuit, wherein the wake-up circuit is coupled to the telephone wire and can be activated when a ring appears on the telephone wire;

a timer, wherein the timer is able to periodically send a signal to activate the wake-up circuit;

a frequency shift keying (FSK) detector and demodulator, wherein the FSK detector and demodulator is coupled to the telephone wire and can be activated by the wake-up circuit to detect an FSK signal on the telephone wire and demodulate the FSK signal and, therefore, export a demodulated signal; and a data-recovery circuit, wherein the data-recovery circuit can receive the demodulated signal, wherein when the wake-up circuit has been activated by the timer to wake up the FSK detector and the data-recovery circuit, but the signal of the channel seizure has not been detected yet after a certain time, then the data-recovery circuit sends a sleeping signal to the wake-up circuit to put the FSK detector and demodulator in a sleeping state.

2. The receiving apparatus of claim 1, wherein the receiving apparatus further comprises a ring detector being coupled to the telephone wire for outputting a control signal to activate the wake-up circuit when the ring appears on the telephone wire.

3. The receiving apparatus of claim 1, wherein the receiving apparatus further comprises a lower-frequency clock to provide a clock for the timer.

4. The receiving apparatus of claim 3, wherein the receiving apparatus further comprises a frequency multiplier to transform the lower-frequency clock into a higher-frequency clock to provide a clock for the FSK detector and demodulator.

5. The receiving apparatus of claim 1, wherein the data-recovery circuit is to process a data message of the caller-ID, the signal of the channel seizure and a signal of a mark.

6. A caller-identification (caller-ID) receiving apparatus, comprising:

a ring detector, wherein the ring detector is coupled to the telephone wire to activate a wake-up circuit when a ring appears on the telephone wire;

a timer, wherein the timer is able to periodically send a signal to activate the wake-up circuit;

a frequency shift keying (FSK) detector and demodulator, wherein the FSK detector and demodulator is coupled to the telephone wire and can be activated by the wake-up circuit to detect an FSK signal on the telephone wire and demodulate the FSK signal and, therefore, export a demodulated signal; and a data-recovery circuit, wherein the data-recovery circuit can receive the demodulated signal, wherein when the wake-up circuit has been activated by the timer to wake up the FSK detector and the data-recovery circuit, but a signal of a channel seizure has not been detected after a certain time, then the data-recovery circuit sends a sleeping signal to the wake-up circuit to put the FSK detector and demodulator in a sleeping state.

7. The receiving apparatus of claim 6, wherein the receiving apparatus further preferable comprises a lower-frequency clock to provide a clock for the timer.

8. The receiving apparatus of claim 7, wherein the receiving apparatus further comprises a frequency multiplier to transform the lower-frequency clock into a higher-frequency clock to provide a clock for the FSK detector and demodulator.

9. The receiving apparatus of claim 6, wherein the data-recovery circuit is to process a data message of the caller-ID, the signal of the channel seizure and a signal of a mark.

* * * * *